(12) United States Patent
Batlaw

(10) Patent No.: US 6,794,426 B2
(45) Date of Patent: Sep. 21, 2004

(54) TONER COMPOUNDS AND COMPOSITIONS FOR BLACK OFFSET INKS

(75) Inventor: Rajnish Batlaw, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 86 days.

(21) Appl. No.: 10/447,847

(22) Filed: May 29, 2003

(65) Prior Publication Data

US 2003/0207961 A1 Nov. 6, 2003

Related U.S. Application Data

(62) Division of application No. 10/001,351, filed on Oct. 26, 2001, now Pat. No. 6,664,311.

(51) Int. Cl.[7] .................. C09D 11/10; C08L 75/04; C08L 75/12; B32B 27/18; B32B 27/40; B05D 3/02

(52) U.S. Cl. ................. 523/160; 524/589; 524/590; 428/195.1; 427/372.2

(58) Field of Search ............... 523/160, 161; 524/589, 590; 106/31.27; 428/195.1; 427/288, 372.2

(56) References Cited

U.S. PATENT DOCUMENTS

| | | | | |
|---|---|---|---|---|
| 4,284,729 A | * | 8/1981 | Cross et al. | 521/158 |
| 4,381,261 A | * | 4/1983 | Bonnet | 534/595 |
| 5,231,135 A | * | 7/1993 | Machell et al. | 525/123 |
| 5,389,958 A | * | 2/1995 | Bui et al. | 347/103 |
| 5,429,841 A | * | 7/1995 | Batlaw et al. | 427/288 |
| 5,637,638 A |   | 6/1997 | Chandler et al. | 524/591 |
| 5,747,554 A | * | 5/1998 | Sacripante et al. | 523/161 |
| 5,780,528 A | * | 7/1998 | Titterington et al. | 523/161 |
| 5,782,966 A |   | 7/1998 | Bui et al. | 106/31.43 |
| 5,886,091 A | * | 3/1999 | Harris et al. | 524/590 |
| 6,255,432 B1 |   | 7/2001 | Evans et al. | 529/49 |
| 6,455,611 B1 | * | 9/2002 | Pears et al. | 523/161 |

FOREIGN PATENT DOCUMENTS

| | | |
|---|---|---|
| EP | 0 769509 | 10/1996 |
| EP | 936257 A1 * | 8/1999 |
| GB | 2305928 A * | 4/1997 |

* cited by examiner

Primary Examiner—Callie Shosho
(74) Attorney, Agent, or Firm—Terry T. Moyer; John E. Vick, Jr.

(57) ABSTRACT

A novel colorant compound is provided which is the addition product of an organic chromophore having at least one reactive hydroxyl or amine substituent, a mono or polyisocyanate, and/or an alcohol. Such a compound provides solubility in oil-based ink compositions, complete water resistance and excellent oil based ink compositions. Furthermore, such colorants provide an easy and efficient way to tone shades of oil based inks. In addition, such colorants provide a way to tone carbon black based lithographic inks that gives the images a appearance of jet black on various types of printing substrates. A method for producing such a colorant is also provided, as well as offset ink compositions comprising such a colorant (including other colorants that provide the same toner performance within black pigment formulations).

17 Claims, No Drawings

TONER COMPOUNDS AND COMPOSITIONS FOR BLACK OFFSET INKS

CROSS REFERENCE TO RELATED APPLICATIONS

This application is a divisional of co-pending application 10/001,351, filed on Oct. 26, 2001 "now U.S. Pat. No. 6,664,311".

FIELD OF THE INVENTION

A novel colorant compound is provided which is the addition product of an organic chromophore having at least one reactive hydroxyl or amine substituent, a mono or polyisocyanate, and/or an alcohol. Such a compound provides solubility in oil-based ink compositions, complete water resistance and excellent oil based ink compositions. Furthermore, such colorants provide an easy and efficient way to tone shades of oil based inks. In addition, such colorants provide a way to tone carbon black based lithographic inks that gives these inks the appearance of being jet black on various types of printing substrates. A method for producing such a colorant is also provided, as well as offset ink compositions comprising such a colorant (including other colorants that provide the same toner performance within black pigment formulations).

BACKGROUND OF THE PRIOR ART

All U.S. and foreign patents cited within this specification are hereby incorporated by reference. The nature of the Offset printing process imposes certain fundamental requirements on the chemical, physical and strength characteristics of its inks. Toners are necessary to provide jet black appearances of images containing standard black pigments, such the, carbon black. Such a toner must be compatible in Offset ink vehicles, must not produce unacceptably high viscosity even at high loadings, and must be fundamentally insoluble in, and unreactive with the aqueous/alcohol fountain solution. Currently, alkali blue is utilized as the most prevalent black pigment toner in offset ink operations. Unfortunately, although such a toner meets the required solubility properties, the toning effects provided thereby simultaneously are less than satisfactory due to an excessive reddening and/or bronzing of the black printed image. An improved toner reducing such unwanted effects is thus highly desired within the black offset ink industry and market. To date, there are no teachings or fair suggestions of such needed improvements provided by and within the pigment for Offset inks prior art. It is believed that certain chromophores with an appropriate pendant group system may not only provide such desired aqueous/alcohol fountain insolubility, but may also provide effective toning with low-reddening and low-bronzing levels within such black offset inks.

Examples of colorants having substituent groups intended to tailor the properties of the colorant may be found in the following references. Batlaw et al., U.S. Pat. No. 5,919,846 disclose a compound which is the addition product of a chromophore and an isocyanate, wherein the isocyanate has a carboxyl containing group bonded thereto. The compound may be incorporated in a composition useful for printing on or dyeing a substrate. Moore et al., U.S. Pat. No. 5,176,745, disclose a poly(oxyalkylene) substituted colorant reacted with a cyclic anhydride such as an alkenyl succinic anhydride, providing a free carboxyl group. The colorant may be made water-soluble by adding a suitable counter ion. Sharma et al., U.S. Pat. No. 5,637,637, disclose a waterborne copolymeric colorant composition prepared by emulsion polymerization of a dye having a reactive vinyl group and a vinyl monomer, such as styrene.

A colorant compound having polymer or pre-polymer substituent groups may be synthesized by the reaction of a colorant and a polyisocyanate as disclosed in Cross et al., U.S. Pat. No. 4,284,729; Krutak et al., U.S. Pat. No. 5,194,463; and Beckmann et al., U.S. Pat. No. 5,616,678.

Ink compositions containing polyurethane substituted colorants have been disclosed. Chandler et al., U.S. Pat. No. 5,637,638, provide a waterborne polyurethaneurea derived colorant intended to be easily erasable from a cellulosic substrate such as paper. Tektronix, Inc., EP 0 769 509 A, disclose a non-erasable ink jet composition containing a colored polyurethane dispersion formed by the resin of at least one polyol, at least one polyisocyanate, at least one internal surfactant and at least one reactive colorant. The dispersion contains particles ranging in size from 0.01 to 5.0 microns.

Alkali Blue pigment and the rhodamine pigment have been used as toners in oil-based inks. Alkali Blue pigment is well known in the art as Pigment Blue 61 (Colour Index #42765:1). Such a toner component is disclosed within U.S. Pat. No. 5,026,627 which teaches a particular combination of surfactants when incorporated with an alkali blue pigment, which then produce a pigment toner exhibiting high strength when used in oil-based inks. While such a pigment is widely used throughout the industry, it exhibits serious drawbacks in that it is difficult to handle, is not conducive to post-addition, creates a reddish tone to carbon black inks, and causes bronzing of the resultant printed image.

U.S. Pat. No. 5,919,846, U.S. Pat. No. 5,919,839, and PCT Patent Application WO 94/14902 describes the reaction of hydroxyl containing colorants with mono and diisocyanates.

SUMMARY OF THE INVENTION

Therefore, one of the objects of the invention is to provide an oil soluble colorant. Another object of this invention is to provide a synthetic route for a polymeric colorant wherein the colorant is substantially soluble in hydrocarbon oil-based inks and is substantially insoluble in water. Still another object of the invention is to provide a colorant that can be used as a toner for oil based inks. Yet another object of the invention is to provide a colorant that can tone carbon black based inks to give a jet black image. Yet another object of the invention is to provide a colorant that can tone carbon black based inks to give a glossier image. Yet another object of the invention is to provide a colorant that can tone carbon black based inks to give an image with substantially reduced bronzing. Yet another object of the invention is to provide a colorant that can tone carbon black based inks and that is easy to handle. Yet another object of the invention is to provide a colorant that can tone carbon black based inks at any stage of the ink manufacturing process.

Accordingly, this invention encompasses a compound comprising the addition product of (a) an organic chromophore having at least one reactive hydroxyl or amine substituent group; (b) a mono or polyisocyanate; and (c) a long chain alcohol wherein said monoisocyanate reacts with said reactive hydroxyl or amine substituent groups to form a urethane colorant; wherein said polyisocyanate reacts with each of said reactive hydroxyl or amine substituent groups to form isocyanate terminal groups on said organic chromophore and, subsequently, said long chain alcohols reacts with said isocyanate terminal groups to form urethane or urea moieties on the resulting compound. More specifically, this invention encompasses a compound conforming to the structure of Formula (I)

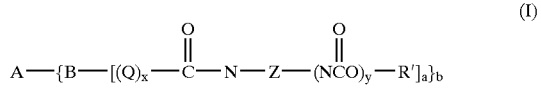
(I)

wherein A is a chromophore, B is a linking group selected from the group consisting of N, NR, O, S, $SO_2$, $SO_2N$, $SO_2NR$, $CO_2$, CON and CONR, Q is selected from the group consisting of $C_2$–$C_{18}$ alkyleneoxy and any combinations thereof, x is from 0 to 200, y is 0 or 1, Z is selected from the group consisting of aliphatic residues and aromatic residues, R' is $C_4$–$C_{30}$ alkyl, a is 1 or 2, b is 1–5, and R is $C_1$–$C_{12}$ alkyl. Preferably, A is a group exhibiting one of the following chromophoric backbones selected from the group consisting of such backbones as nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine or indigoid. Preferably, such a chromophore is a triphenylmethane, azo, methine, and anthraquinone. Preferably, such a colorant may be defined alternatively as comprising a chromophore that provides $\lambda_{max}$ absorption measurements between about 550 and 610 nm (wavelengths), most preferably wavelengths between about 560 and 580 nm. Preferably, B is N (and thus a is 2), or 0 (and thus a is 1), Q is a combination of ethyleneoxy and propyleneoxy with from about 3 to about 50 moles thereof (to form a polyoxyalkylenated compound), y is 0 (although the presence of a diisocyanate is of nearly equal preference, and R' is of sufficient length to create nearly total oil-solubility (and thus nearly total water-insolubility) for the inventive compound. The Z group can basically be any group as this group is pendant to the second isocyanate substituent prior to reaction with the first isocyanate. Thus, Z can be any aliphatic, be it alkyl, alkenyl, alkynyl in nature, with any constituent groups, such as esters, ethers, acids, anyhydrides, halogens, metals, and the like, or any aromatic group, be it phenyl, polyphenyl (such as naphthyl, anthraquinone, and the like), phenylalkyl, substituted phenyl, substituted phenylalkyl, phenylalkenyl, substituted phenylalkenyl, and the like, again, with any constitutent groups, either on the ring (or rings) itself or attached to any pendant group on the ring (or rings), such as, without limitation, esters, ethers, anhydrides, halogens, metals, acids, and the like. Preferably, such a group is $C_4$–$C_{24}$ alkyl in nature.

Also encompassed within this invention is a black offset ink composition comprising a black pigment and a toner component, wherein, when measured under CIELAB and CMC standards, and at a brightness level (L*) of at least 20, said ink exhibits a hue angle (h) of at most 50, more preferably, at most 48, still more preferably, at most 46, and most preferably at most 44. Further encompassed within this invention is a black offset ink composition comprising a black pigment and a toner component, wherein when measured under CIELAB and CMC standards, and a brightness level (L*) of at least 20, said ink exhibits an a* level of at most 2.2 (preferably, at most 2.0, more preferably, at most 1.5, and most preferably at most 1.2), a b* level of at most 4.0 (preferably at most 3.8, more preferably at most 3.5, still more preferably at most 3.0, and most preferably, at most 2.5), and a hue angle (h) of at most 67 (more preferably, at most 60, still more preferably, at most 55, and most preferably, at most 50. Additionally encompassed within this invention is a method of printing a substrate comprising the contacting of such a substrate with either of the ink compositions noted above. Such inventive offset inks and methods utilizing thereof do not require the same exact inventive compounds disclosed above; to the contrary, as discussed more below, certain other toner components, heretofore not utilized for such a purpose, have been found to be effective to an acceptable toning level in order to provide low reddening, low bronzing effects within jetter black offset inks. Additionally, this inventive encompasses printed substrates (including, without limitation, paper, cardboard, paperboard, and other like cellulosic- or synthetic-based substrates, films and other plastic substrates, and textiles, such as fabrics made from natural fibers, such as cotton, linen, ramie, and the like, synthetic fibers, such as polyester, polyamide, polyaramid, and the like, and inorganic fibers, such as fiberglass, boron-derived fibers, glass, and the like, and blends of such fiber types) to which these inventive inks compositions have been applied.

DESCRIPTION OF THE INVENTION

The inventive colorants thus facilitate the toning of shades for the oil-based inks with an ability to tone shades of oil-based inks exhibiting low reddening and bronzing effects. The colorants according to the invention exhibit excellent compatibility with the binder and printing ink systems customary for printing processes, such as lithography, in single-color or multi-color printing. They are, for example, easily incorporable in binder systems for letterpress inks, offset inks, heat-set offset inks or web-fed newsprint inks. The printing inks with the colorants according to the invention are satisfactorily printable and produce strong bright prints. The colorants according to the invention are also suitable for mixing with black pastes to produce printing inks which, on printing, produce an excellent brightening and jetting effect. The colorants are also suitable for producing printing inks for copy papers and ink ribbons, and as coloring agents in toners for electrophotographic printing.

Without limiting the scope of the invention, the preferred features of the invention are hereinafter set forth. The ink compositions of the present invention are oily solutions of one or more colorants. The colorants themselves are characterized by three primary components: (1) an organic chromophore having (2) a polyoxyalkylene substituent and (3) a urethane covalently bonded to the polyoxyalkylene substituent.

A wide variety of polyoxyalkylene substituted organic chromophores and their preparation are well known in the art. These materials can be represented by the general formula:

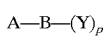

where A is an organic chromophore, Y is a straight or branched polyoxyalkylene substituent comprised of from 1–200 radicals of $C_{2-18}$ alkylene oxides. The chromophore is covalently bonded to the polyoxyalkylene substituent by a linking group such as N, $NR_3$, O, S, $SO_2$, $SO_2N$, $SO_2NR_3$, $CO_2$, CON or $CONR_3$, where $R_3$ is H, $C_{1-12}$ alkyl, phenyl or benzyl. Preferably, the linking group is N, $NR_3$, O, $SO_2N$ or $SO_2NR_3$. Two polyoxyalkylene substituents may be bonded to the chromophore through a trivalent linking group. The letter "p" represents the number of polyoxyalkylene chains per chromophore and may be from 1–6, preferably 1–4.

In a preferred embodiment, the polyoxyalkylene substituents are primarily comprised of from 3 to 50 radicals of ethylene oxide, propylene oxide or random and block copolymers thereof. Minor amounts of glycidol, butylene oxide and other compatible monomers may also be present.

A wide variety of organic chromophores are suitable for use in the present invention. Examples of useful chromophores include: nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine or indigoid chromophore groups. Of particular interest are azo, methine, triphenylmethanes and anthraquinone chromophores. While metal containing chromophores, such as phthalocyanines, may also be employed, from an environmental perspective, their use is less desirable.

Synthesis of organic chromophores containing polyoxyalkylene substituents are disclosed in Kuhn, U.S. Pat. No. 3,157,633, Brendle, U.S. Pat. No. 4,167,510, Cross et al., U.S. Pat. No. 4,284,729 and Baumgartner et al., U.S. Pat. No. 4,732,570, incorporated by reference herein.

The polyoxyalkylene substituted organic chromophore is reacted with an isocyanate to create a covalent bond. Preferably, the polyoxylakylene substituent has a pendant or terminal nucleophilic functionality selected OH, $NH_2$, $NHR_2$ and SH, wherein $R^2$ is $C_{1-8}$ alkyl, preferably $C_{1-8}$ alkyl, which reacts to create the bond. In a more preferred embodiment, the nucleophilic functionality is OH or $NH_2$ which is attached to a primary carbon. The urethane may be incorporated into the colorant in a number of ways. In one embodiment, an isocyanate is reacted with the nucleophilic functionality of the polyoxyalkylene substituent to provide a urethane bond. Suitable isocyanates include octadecylisocyanate, butyl isocyanate. In a preferred embodiment, the oleophilic character of the colorant is increased by providing an isocyanate with a substituent having up to 30 carbon atoms. By way of example, the substituent may be $C_{1-30}$ alkyl, cycloalkyl or alkenyl, phenyl, naphthyl or benzyl. Particular useful isocyanates include: octadecenyl isocyanate available from Bayer.

Although isocyanates or diisocyanates are preferred for such a purpose, other bridging groups, such as esters, anhydrides, and any other moiety that permits addition of oily long-chain alkyls to the polyoxyalkylenated groups and does not render the resultant compound too water-soluble may also be utilized.

A further embodiment of the invention may be realized by the reaction of a excess of diisocyanate with the nucleophilic functionality of the polyoxyalkylene substituent to create a urethane, with an unreacted isocyanate group, that is free to react with a long chain alcohol selected from the group consisting of octanol, tetradecanol, undecanol, stearyl alcohol, 2-decanol, 1,12-dodecanol, 1,2-decanol, 1,10-decanol, 4-decanol, 2-octanol, 3-octanol, 3-octanol, nonanol, 2-undecanol, 2-tetradecanol, 1,2-tetradecanol, 1,14-tetradecanediol, heptadecanol, and mixtures thereof.

The above mentioned cyclic isocyanates may be substituted with CN, $NO_2$, halogens, and $SO_3$ without deviating from the scope of the invention.

The toning colorant may be broadly represented by Formula (I)

(I)

wherein A is a chromophore, B is a linking group selected from the group consisting of N, $NR_2$, O, S, $SO_2$, $SO_2N$, $SO_2NR$, $CO_2$, CON and CONR, Q is selected from the group consisting of $C_2$–$C_{18}$ alkyleneoxy and any combinations thereof, x is from 0 to 200, y is 0 or 1, Z is selected from the group consisting of aliphatic residues and aromatic residues, R' is $C_4$–$C_{30}$ alkyl, a is 1 or 2, b is 1–5, and R is $C_1$–$C_{12}$ alkyl.

Thus, one non-limiting preferred colorant contemplated within this invention, as is the method of making such a compound, conforms to the structure of Formula (II)

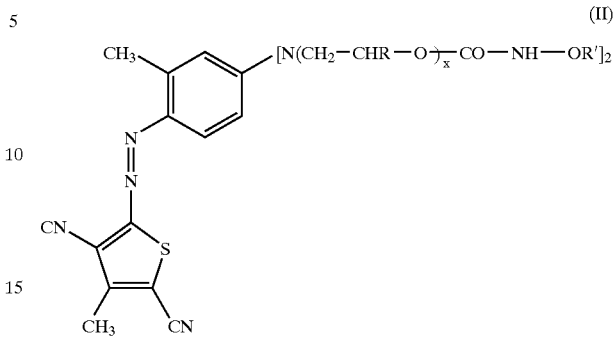

(II)

wherein x is 2 to; wherein R is selected from the group consisting of hydrogen, halo, formyl, $C_{1-20}$ alkoxy, and $C_{1-20}$ alkyl; wherein R' is selected from the group consisting of $C_{1-10}$ alkoxy, $C_{1-10}$ polyoxyalkoxy, $C_1$–$C_{10}$ alkylester, $C_{1-10}$ alkyl and $C_{1-30}$ long chain alcohol; said method comprising the reaction of at 1 to 200 moles of a compound selected from the group consisting of an alkylene oxide having from 3 to 10 carbon atoms and glycidol.

It is an advantage of the present invention that the colorants can be used to tone shades of oil based inks to obtain desired look of the printed image. It is also an advantage of the present invention that the colorants can be added to the oil based inks at any stage during the manufacture or use of the inks. It is another advantage of the present invention that the colorants can be used in combination with other oil based ink carrier materials to obtain ink compositions that possess excellent spectral strengths. It is still another advantage of the present invention that the colorants are substantially transparent. It is yet another advantage of the present invention that the colorants can be used to tone carbon black based inks to provide jet blacks. It is yet another advantage of the present invention that the colorants are easy to handle in production.

It has been found that the reaction of isocyanates with oxyalkylenated chromophores results in the formation of colorants substantially soluble in oil based ink systems conforming with the Formula (III)

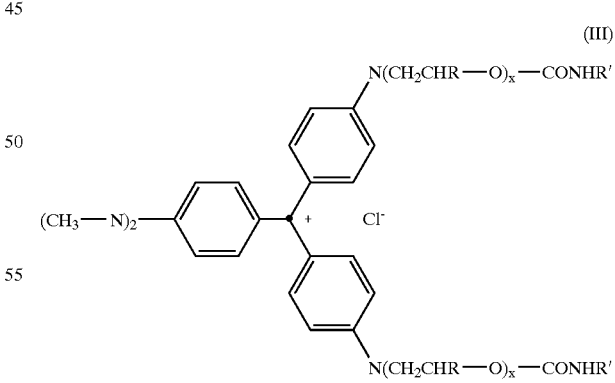

(III)

The standard alkali blue pigment used in the industry tones the carbon black based oily ink providing a reddish tone (higher a values), and a bronzing effect on the printed image. Furthermore, the alkali blue pigment is very difficult to handle in production and can be added to the carbon black based inks only during the manufacture of the inks. The inventive colorants therefore provide clear distinct advantages over the alkali blue and other blue and magenta pigments used.

Offset ink compositions generally comprise a pigment and/or a dyestuff (for black, carbon black is the most prevalent in terms of low cost, high availability, and in ease in use), a vehicle (such as a petroleum distillate), and resin (such as hard resin and drying oil alkyd), and additives (such as waxes, driers, antioxidants, anti-set-off compounds, litho additives, and rheology modifiers. A common and potentially preferred base composition (including standard The proportions of ingredients) is:

| STANDARD OFFSET BLACK INK COMPOSITION | |
|---|---|
| Component | Amount |
| Carbon Black (CI Pigment Black 7) | 20.0 |
| Reflex Blue (CI Pigment Blue 18) | 2.0 |
| Oxidation Drying Vehicle | 70.0 |
| Anti-oxidant Paste | 2.0 |
| Alkali-refined linseed oil | 6.0 |

The amount of toner component present within the inventive ink is from 0.01 to 50 parts per 100 parts of the total composition. Preferably, this amount is from 1 to 20 parts, more preferably from 2 to 15 parts, and most preferably from about 5 to about 10 parts. Surprisingly, it has been realized that higher concentrations (5 parts and higher, more particularly, above 6 parts) provide vast, unexpected improvements in measured hue angle and blueness of the sample inventive ink compositions. As noted below in greater detail, the blueness and corresponding hue angle are desirous and are surprisingly attained through the utilization of the inventive or otherwise selected toner components.

Of great importance to this invention, as well as any ink composition, is the ability for such a composition to provide desirable color, in terms of hue as well as visual effect. Visual color perception is based not in terms of red/green, yellow/blue, or other grouping of colors, but in terms of saturation (otherwise known as chroma) and hue. A numerical system of color differences is calculated in terms that agree with actual visual perception. Thus, to properly define or designate a particular label to a viewed color sample through analysis in a manner other than empirically, a measurement must be made of the distances between a sample color and a standard in the same values. Chroma is the amount of pure color contained in the sample, and is graphically measured (in CIELAB and/or CMC terms) as the distance from the center of the a* and b* axis for the sample. Brightness is a measurement of such a value for the particular sample of color. Hue angle is a measurement in terms of chroma as it is perceived by the viewer. A color difference between two distinct point on the axis can thus be described as the difference in each points' brightness (L*) value, the difference in their chroma (c*) value, and the difference in their hue angle (h*). Hue is measured in degrees from 0 to 360 (or a correlated negative angle on a Cartesian graph), where red is represented at the 0 angle, yellow at 90, green at 270 (or −90, for example), and blue at 360. The hue attribute of visual sensation has given rise to the color names (e.g., blue, green, yellow, red, etc.). Hue differences then depend primarily on variations in the wavelength of light reaching the eye at a particular angle from the viewed sample. Such a measurement (hue angle) is thus one of the three standard elements of color appearance (with the other two being brightness and saturation, or chroma, as noted above). Its calorimetric equivalent is dominant wavelength and, in terms of this invention, is of utmost importance, particularly for black offset inks, in providing a more effective, jetter, less red, black ink. The target of this invention is thus to provide the hue angle towards the red (Hue=0), or even towards blue (Hue=270, or −90). A hue angle measurement closer to zero or even less or alternatively, further from the typical yellow (Hue=90), is thus the unexpected beneficial characteristic of these inventive inks, particularly as compared with the inks of the prior art comprising the state of the art in toning components (alkali blue pigment 61, etc., as discussed above).

DESCRIPTION OF THE PREFERRED EMBODIMENT

Without limiting the scope of the invention, the preferred features of the invention are hereinafter set forth.

Colorant Formation

The general methods of making the preferred inventive colorants are as follows:

EXAMPLE 1

70 parts of a polymeric blue colorant, methylium, bis(4-aminophenyl)(4-aminophenyl)-, chloride, ethoxylated (~4–10 moles), propoxylated (~4–10 moles), having a Color Value of 65, were charged to a 3-neck flask. Added to this formulation were 80 parts of octadecylisocyanate, available from Aldrich, and 1.5 parts of dibutyltin dilaurate (catalyst). The entire mixture was then heated to 70–80° C. for 2–6 hours or until the reaction is complete. The absence (disappearance) of a peak at about 2275 cm$^{-1}$ (NCO) and the appearance (or increase in magnitude) of peaks at about 1740–1680 cm$^{-1}$ and about 1540–1530 cm$^{-1}$ corresponding to urethane frequencies was used to confirm this. The product had a color value of 29 at the $\lambda_{max}$ of 595.

EXAMPLE 2

70 parts of the starting blue colorant from EXAMPLE 1, above, were charged to a 3-neck flask. Added to this formulation was 75 parts of octadecenyl isocyanate and 2.1 parts of TMXDI (diisocyanate), available from Aldrich, and 4 parts of dibutyltin dilaurate (catalyst). The entire mixture was then heated to 70–80° C. for 2–6 hours or until the reaction is complete. The absence (disappearance) of a peak at about 2275 cm$^{-1}$. (NCO) and the appearance (or increase in magnitude) of peaks at about 1740–1680 cm$^{-1}$ and about 1540–1530 cm$^{-1}$ corresponding to urethane frequencies was used to confirm this. The product had a color value of 28 at the $\lambda_{max}$ of 595.

EXAMPLE 3

100 parts of a polymeric violet colorant, oxirane, methyl-, polymer with oxirane, ether (ethoxylated ~2–10 moles, and propoxylated ~4–14 moles) with 2,2'-((3-methyl-4-)(2-amino -4-methyl-3,5-dicyanothiophene)azo-phenyl-imino-bis)ethanol (2:1), having a Color Value of 28, was charged into a 3-neck flask. Added to this formulation was 40 parts of TMXDI (diisocyanate), available from Bayer, and 4 parts of dibutyltin dilaurate (catalyst). The entire mixture was then heated to 70–80° C. for 2–6 hours or until all the hydroxyl groups reacted completely leaving an isocyanate terminated molecule. The absence (disappearance) of a peak at about 3600 cm$^{-1}$ (OH) and the appearance (or increase in magnitude) of peaks at about 2275–2235 cm$^{-1}$ corresponds to isocyanate frequencies was used to confirm this. Subsequently, 38 parts of octadecanol were charged to the flask and the reaction continued for 20 more hours at 70–80.degree. C. or until all of the isocyanate peak, as measured by IR spectroscopy, had disappeared, leaving a urethane based polymeric colorant. The absence (disappearance) of a peak at about 2275 cm$^{-1}$ (NCO) and the appearance (or increase in magnitude) of peaks at about 1740–1680 cm$^{-1}$ and about 1540–1530 cm$^{-1}$ corresponding to urethane frequencies was used to confirm this. The product had a color value of 15.5 at the $\lambda_{max}$ of 569.

EXAMPLE 4

153 parts of the polymeric violet colorant of EXAMPLE 3 were charged into a 3-neck flask. Added to this formulation was 59 parts of octadecylisocyanate and 4 parts of dibutyltin dilaurate (catalyst). The entire mixture was then heated to 70–80° C. for 2–6 hours or until the reaction was complete. The absence (disappearance) of a peak at about 2275 cm$^{-1}$ (NCO) and the appearance (or increase in magnitude) of peaks at about 1740–1680 cm$^{-1}$ and about 1540–1530 cm$^{-1}$ corresponding to urethane frequencies was used to confirm this. The product had a color value of 20 at the $\lambda_{max}$ of 569.

EXAMPLE 5

100 parts of the polymeric violet colorant of EXAMPLE 3 were charged into a 3-neck flask. Added to this formulation was 20 parts of TMXDI (diusocyanate) and 18 parts of isophorone diisocyanate, available from Bayer, and 1.5 parts of dibutyltin dilaurate (catalyst) in 1-methyl-2-pyrrolidinone. The entire mixture was then heated to 70–80° C. for 2–6 hours or until all the hydroxyl groups reacted completely leaving an isocyanate terminated molecule. The absence (disappearance) of a peak at about 3600 cm$^{-1}$ (OH) and the appearance (or increase in magnitude) of peaks at about 2275–2235 cm$^{-1}$ corresponds to isocyanate frequencies was used to confirm this. Subsequently, 38 parts of octadecanol were charged to the flask and the reaction continued for 20 more hours at 70–80° C. or until all of the isocyanate peak, as measured by IR spectroscopy, had disappeared, leaving a urethane based polymeric colorant. The absence (disappearance) of a peak at about 2275 cm$^{-1}$ (NCO) and the appearance (or increase in magnitude) of peaks at about 1740–1680 cm$^{-1}$ and about 1540–1530 cm$^{-1}$ corresponds to urethane frequencies was used to confirm this. The product had a color value of 15.1 at the $\lambda_{max}$ of 569.

EXAMPLE 6

100 parts of the polymeric violet colorant of EXAMPLE 3 were charged into a 3-neck flask. Added to this formulation was 38 parts of Isophorone diisocyanate, available from Bayer, and 4 parts of dibutyltin dilaurate (catalyst). The entire mixture was then heated to 70–80° C. for 2–6 hours or until all the hydroxyl groups reacted completely leaving an isocyanate terminated molecule. The absence (disappearance) of a peak at about 3600 cm$^{-1}$ (OH) and the appearance (or increase in magnitude) of peaks at about 2275–2235 cm$^{-1}$ corresponds to isocyanate frequencies was used to confirm this. Subsequently, 38 parts of octadecanol were charged to the flask and the reaction continued for 20 more hours at 70–80° C. or until all of the isocyanate peak, as measured by IR spectroscopy, had disappeared, leaving a urethane based polymeric colorant. The absence (disappearance) of a peak at about 2275 cm$^{-1}$ (NCO) and the appearance (or increase in magnitude) of peaks at about 1740–1680 cm$^{-1}$ and about 1540–1530 cm$^{-1}$ corresponding to urethane frequencies was used to confirm this. The product had a color value of 15.5 at the $\lambda_{max}$ of 569.

Ink Composition

Ink Composition 1 (Control)

100 parts of an untoned base black 1K-01967 (carbon black pigment) from CPS Inc. was drawn down on paper using a blade. The image was observed visually and measurements of L,a,b,C,h taken on an UltraScan® XE spectrophotometer (from Hunterlab).

Ink Composition 2

5 parts of the colorant produced in Example 1 was mixed with 95 parts of a base black 1K-01967 from CPS Inc. The product was mixed well and then drawn down on paper using a blade. The image was observed visually and measurements of L,a,b,C,h were taken.

Ink Composition 3

5 parts of the colorant produced in Example 2 was mixed with 95 parts of a base black 1K-01967 from CPS Inc. The product was mixed well and then drawn down on paper using a blade. The image was observed visually and measurements of L,a,b,C,h were taken.

Ink Composition 4

5 parts of the colorant produced in Example 3 was mixed with 95 parts of a base black 1K-01967 from CPS Inc. The product was mixed well and then drawn down on paper using a blade. The image was observed visually and measurements of L,a,b,C,h were taken.

Ink Composition 5

5 parts of the colorant produced in Example 4 was mixed with 95 parts of a base black 1K-01967 from CPS Inc. The product was mixed well and then drawn down on paper using a blade. The image was observed visually and measurements of L,a,b,C,h were taken.

Ink Composition 6

5 parts of the colorant produced in Example 5 was mixed with 95 parts of a base black 1K-01967 from CPS Inc. The product was mixed well and then drawn down on paper using a blade. The image was observed visually and measurements of L,a,b,C,h were taken.

Ink Composition 7

5 parts of the colorant produced in Example 6 was mixed with 95 parts of a base black 1K-01967 from CPS Inc. The product was mixed well and then drawn down on paper using a blade. The image was observed visually and measurements of L,a,b,C,h were taken.

Ink Composition 8

10 parts of the colorant produced in Example 6 was mixed with 90 parts of a base black 1K-01967 from CPS Inc. The product was mixed well and then drawn down on paper using a blade. The image was observed visually and measurements of L,a,b,C,h were taken.

Ink Composition 9 (Comparative Example)

5 parts of the Alkali Blue flush FB4365 from CPS Inc. was mixed with 95 parts of a base black 1K-01967 from CPS Inc. The product was mixed well and then drawn down on paper using a blade. The image was observed visually and measurements of L,a,b,C, and h were taken. The image also empirically appears to be a redder black for the comparative example when drawn down on paper as compared with the inventive inks.

Ink Composition 10 (Comparative Example)

10 parts of the Alkali Blue flush FB4365 from CPS Inc. was mixed with 90 parts of a base black 1K-01967 from CPS Inc. The product was mixed well and then drawn down on paper using a blade. The image was observed visually and measurements of L,a,b,C, and h were taken. The image also empirically appears to be a redder black for the comparative example when drawn down on paper as compared with the inventive inks.

INK COMPOSITIONs 2–8 all exhibited jetter black appearances than the Control and the Comparative Examples empirically. The colorimetric values also showed differences as noted as follows:

TABLE

Chromatic Properties of the Ink Compositions

| # | Toner | Toner Amt. | L | A | B | C | H |
|---|---|---|---|---|---|---|---|
| 1 | Ink Composition 1 | 0% | 25.13 | 1.2 | 4.1 | 4.26 | 73.8 |
| 2 | Ink Composition 2 | 5% | 23.92 | 1.3 | 2.7 | 2.94 | 64.5 |
| 3 | Ink Composition 4 | 5% | 24.23 | 1.5 | 3.3 | 3.59 | 65.8 |
| 4 | Ink Composition 5 | 5% | 23.75 | 1.8 | 3.8 | 4.19 | 64.3 |
| 5 | Ink Composition 6 | 5% | 21.57 | 2.0 | 2.2 | 2.99 | 47.8 |
| 6 | Ink Composition 7 | 5% | 21.7 | 1.9 | 1.8 | 2.57 | 43.1 |
| 7 | Ink Composition 8 | 10% | 21.34 | 1.49 | −1.60 | 2.19 | 313.0 |
| 8 | Ink Composition 9 | 5% | 24.17 | 2.9 | 3.8 | 4.77 | 53.4 |
| 9 | Ink Composition 10 | 10% | 24.72 | 2.22 | 3.13 | 3.84 | 54.68 |

Thus, the inventive inks exhibited vastly improved and unexpectedly good measurements, particularly for hue angle and b*, as compared with the standard alkali blue-containing inks. Especially unexpected was the vast change in hue angle and b* measurement upon the increase of concentration of the toner in the inventive ink composition 8. The decrease in hue angle and b* value results in a measurement much closer to the blue axis (313 degrees) which is entirely unexpected, particularly when compared with the measurement of the higher concentration comparative ink composition 10. Such a measurement is indicated as well by the jet black appearance of such a toned ink when viewed empirically.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications that incorporate the features of the invention within the true meaning, spirit, and scope of such claims.

What I claim is:

1. A substrate selected from the group consisting of a textile, a polymeric film, and a paper, a portion of which is contacted with a black offset ink composition comprising at least one black pigment, at least one diluent selected from the group consisting of mineral oils, hydrocarbon solvents, vegetable oils and mixtures thereof, and a toner component, wherein said toner component is a urethane compound produced through the reaction of an organic chromophore having at least one reactive hydroxyl or amine substituent group and at least one monoisocyanate reactant.

2. The substrate of claim 1 wherein said organic chromophore is selected from the group consisting of azo, diphenylmethane, triarylmethane, xanthene, methine, acridine, quinoline, thiazole, indamine, indophenol, azine, oxazine, thiazine, anthraquinone, indigoid, and phthalocyanine chromophores.

3. The substrate of claim 2 wherein said organic chromophore comprises at least one poly(oxyalkylene) substituent, having a straight or branched chain of from 3 to 200 residues of $C_{2-18}$ alkylene oxides.

4. The substrate of claim 3 wherein said alkylene oxide residues are selected from the group consisting of ethylene oxide, propylene oxide, and mixtures thereof.

5. The substrate of claim 1 wherein said monoisocyanate is selected from the group consisting of octadecenylisocyanate, butylisocyanate, and any mixtures thereof.

6. A substrate selected from the group consisting of a textile, a polymeric film, and a paper, a portion of which is contacted with a black offset ink composition comprising at least one black pigment, at least one diluent selected from the group consisting of mineral oils, hydrocarbon solvents, vegetable oils and mixtures thereof, and a toner component, wherein said toner component is a urethane or urea compound produced through the sequential reaction of an organic chromophore having at least one reactive hydroxyl or amine substituent group and at least one polyisocyanate to produce a resultant isocyanate intermediate, followed by reaction of said resultant isocyanate intermediate with a long chain alcohol having at least eight carbon atoms therein.

7. The substrate of claim 6 wherein said long chain alcohol is selected from the group consisting of octanol, tetradecanol, undecanol, stearyl alcohol, 2-decanol, 1,12-dodecanol, 1,2-decanol, 1,10-decanol, 4-decanol, 2-octanol, 3-octanol, 3-octanol, nonanol, 2-undecanol, 2-tetradecanol, 1,2-tetradecanol, 1,14-tetradecanediol, heptadecanol, and mixtures thereof.

8. The substrate of claim 7 wherein said organic chromophore is selected from the group consisting of azo, diphenylmethane, triarylmethane, xanthene, methine, acridine, quinoline, thiazole, indamine, indophenol, azine, oxazine, thiazine, anthraquinone, indigoid, and phthalocyanine chromophores.

9. The substrate of claim 8 wherein said organic chromophore comprises at least one poly(oxyalkylene) substituent, having a straight or branched chain of from 3 to 200 residues of $C_{2-18}$ alkylene oxides.

10. The substrate of claim 9 wherein said alkylene oxide residues are selected from the group consisting of ethylene oxide, propylene oxide, and mixtures thereof.

11. The substrate of claim 6 wherein said polyisocyanate is selected from the group consisting of 2,4-toluene diisocyanate, 2,6-toluene diisocyanate, 4,4'-biphenylene diisocyanate, 2,2'-diphenylmethane diisocyanate, 4,4'-diphenylmethane diisocyanate, 2,4'-diphenylmethane diisocyanate, tetramethyl-m-xylene diisocyanate, p-xylene diisocyanate, methylenedi-p-phenyl diisocyanate, m-phenylene diisocyanate, p-phenylene diisocyanate, hexamethylene diisocyanate, isophorone diisocyanate, 4,4'-diisocyanatodiphenyl ether, bis(4-isocyanatophenyl) sulfone, isopropylidene bis(4-phenyl isocyanate), naphthalene-1,5-diisocyanate, 1-chloro-2,4-phenylene diisocyanate, 3,3'-bitolylene-4,4'-diisocyanate, 3,3'-dimethoxy-4,4'-biphenylene diisocyanate, 3,3'-dichloro-4,4'-biphenylene diisocyanate, 2,2',5,5'-tetramethyl-4,4'-biphenylene diisocyanate, diphenylethane-4,4'-diisocyanate, dicyclohexylmethane-4,4'-diisocyanate, and any mixtures thereof.

12. A substrate selected from the group consisting of a textile, a polymeric film, and a paper, a portion of which is contacted with a black offset ink composition comprising at least one black pigment, at least one diluent selected from the group consisting of mineral oils, hydrocarbon solvents, vegetable oils and mixtures thereof, and a toner component, wherein said toner component is a urethane compound conforming to the structure of Formula (I)

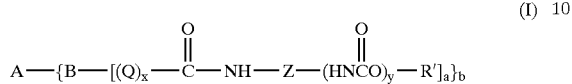

(I)

wherein A is a chromophore, B is a linking group selected from the group consisting of N, NR, O, S, $SO_2$, $SO_2N$, $SO_2NR$, $CO_2$, CON and CONR, Q is selected from the group consisting of $C_2$–$C_{18}$ alkyleneoxy and any combinations thereof, x is from 0 to 200, y is 0 or 1, Z is selected from the group consisting of aliphatic residues and aromatic residues, R' is $C_4$–$C_{30}$ alkyl, a is 1 or 2, b is 1–5, and R is $C_1$–$C_{12}$ alkyl.

13. The substrate of claim 12 wherein A is a group exhibiting one of the following chromophoric backbones selected from the group consisting of such backbones as nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine and indigoid.

14. The substrate of claim 12 wherein Q is a combination of ethyleneoxy and propyleneoxy groups with from about 3 to about 50 moles thereof.

15. A method of coloring a paper, polymeric film, or textile substrate comprising the steps of
   (a) providing a substrate selected from the group consisting of a paper article, a polymeric film, and a textile article;
   (b) contacting at least a portion of said substrate with a black offset ink composition comprising at least one black pigment, and least one diluent selected from the group consisting of mineral oils, hydrocarbon solvents, vegetable oils and mixtures thereof, and a toner component, wherein said toner component is a urethane compound produced through the reaction of an organic chromophore having at least one reactive hydroxyl or amine substituent group and at least one monoisocyanate reactant; and
   (c) heating said contacted substrate to a temperature and for a period of time sufficient to effectively fix said compound to the surface of said substrate.

16. A method of coloring a paper, polymeric film, or textile substrate comprising the steps of
   (a) providing a substrate selected from the group consisting of a paper article, a polymeric film, and a textile article;
   (b) contacting at least a portion of said substrate with a black offset ink composition comprising at least one black pigment, at least one diluent selected from the group consisting of mineral oils, hydrocarbon solvents, vegetable oils and mixtures thereof, and a toner component, wherein said toner component is a urethane or urea compound produced through the sequential reaction of an organic chromophore having at least one reactive hydroxyl or amine substituent group and at least one polyisocyanate to produce a resultant isocyanate intermediate, followed by reaction of said resultant isocyanate intermediate with a long chain alcohol having at least eight carbon atoms therein; and
   (c) heating said contacted substrate to a temperature and for a period of time sufficient to effectively fix said compound to the surface of said substrate.

17. A method of coloring a paper, polymeric film, or textile substrate comprising the steps of
   (a) providing a substrate selected from the group consisting of a paper article, a polymeric film, and a textile article;
   (b) contacting at least a portion of said substrate with a black offset ink composition comprising at least one black pigment, at least one diluent selected from the group consisting of mineral oils, hydrocarbon solvents, vegetable oils and mixtures thereof, and a toner component, wherein said toner component is a urethane compound conforming to the structure of Formula (I)

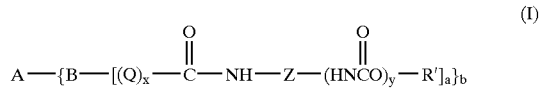

(I)

wherein A is a chromophore, B is a linking group selected from the group consisting of N, NR, O, S, $SO_2$, $SO_2N$, $SO_2NR$, $CO_2$, CON and CONR, Q is selected from the group consisting of $C_2$–$C_{18}$ alkyleneoxy and any combinations thereof, x is from 0 to 200, y is 0 or 1, Z is selected from the group consisting of aliphatic residues and aromatic residues, R' is $C_4$–$C_{30}$ alkyl, a is 1 or 2, b is 1–5, and R is $C_1$–$C_{12}$ alkyl; and
   (c) heating said contacted substrate to a temperature and for a period of time sufficient to effectively fix said compound to the surface of said substrate.

* * * * *

UNITED STATES PATENT AND TRADEMARK OFFICE
CERTIFICATE OF CORRECTION

PATENT NO. : 6,794,426 B2
DATED : September 21, 2004
INVENTOR(S) : Batlaw, Rajnish It is certified that error appears in the above-identified patent and that said Letters Patent is hereby corrected as shown below:

Column 11,
Line 61, after the word "pigment," insert the word -- and --.

Column 12,
Line 51, after the word "consisting" insert the word -- essentially --.

Column 13,
Line 29, after the word "phthalocyanine" delete "and" and insert -- or --.
Line 42, after the word "and" insert the word -- at --.

Column 14,
Line 29, after the word "diluent" delete the words "selected from the group consisting of mineral oils, hydrocarbon solvents, vegetable oils and mixutes thereof".

Signed and Sealed this

Tenth Day of May, 2005

JON W. DUDAS
*Director of the United States Patent and Trademark Office*